US009810314B2

(12) United States Patent
Behounek et al.

(10) Patent No.: US 9,810,314 B2
(45) Date of Patent: Nov. 7, 2017

(54) ROTARY SHIFTER ASSEMBLY

(71) Applicant: Kongsberg Driveline Systems I, Inc., Novi, MI (US)

(72) Inventors: Jeff Behounek, Macomb, MI (US);
Thomas Blicharz, Livonia, MI (US);
Jeffrey Dulzo, Novi, MI (US);
Terrentha Hill, Redford, MI (US);
Jonathan Love, Waterford, MI (US);
Kenneth Shepard, Troy, MI (US);
Harry Edward Koontz, Troy, MI (US)

(73) Assignee: KONGSBERG DRIVELINE SYSTEMS I, INC., Novi, MI (US)

( * ) Notice: Subject to any disclaimer, the term of this patent is extended or adjusted under 35 U.S.C. 154(b) by 2 days.

(21) Appl. No.: 14/630,971

(22) Filed: Feb. 25, 2015

(65) Prior Publication Data
US 2016/0245396 A1    Aug. 25, 2016

(51) Int. Cl.
*F16H 59/08*    (2006.01)
*F16H 61/24*    (2006.01)

(52) U.S. Cl.
CPC .............. *F16H 59/08* (2013.01); *F16H 61/24* (2013.01); *F16H 2059/081* (2013.01); *F16H 2061/247* (2013.01)

(58) Field of Classification Search
CPC ....... F16H 2059/0221; F16H 2059/026; F16H 2059/081; F16H 59/00; F16H 59/02;
(Continued)

(56) References Cited

U.S. PATENT DOCUMENTS 2,848,902 A    8/1958  Hale
3,326,315 A    6/1967  Richards
(Continued)

FOREIGN PATENT DOCUMENTS

CN    201198897 Y    2/2009
DE    19733609 C2    7/1999
(Continued)

OTHER PUBLICATIONS

English language abstract for DE 19808665 extracted from espacenet.com on Jun. 24, 2016, 1 page.
(Continued)

*Primary Examiner* — Victor MacArthur
*Assistant Examiner* — Joseph Brown
(74) *Attorney, Agent, or Firm* — Howard & Howard Attorneys PLLC

(57) ABSTRACT

A shifter assembly for changing gears in a vehicle transmission, including a housing and a shift rod rotatably supported in the housing. The shift rod is selectively movable between a plurality of radial positions. A disc is in rotational communication with the shift rod for concurrent movement between the radial positions. The disc defines a plurality of gates each having respective first and second ends. A plurality of solenoids are disposed in the housing adjacent the disc. Each of the solenoids has a plunger selectively movable between a first position spaced from the disc and a second position disposed within one of the gates. The gates are spaced equally from each other and are radially aligned about a common reference circle. Rotation of the shift rod is selectively limited by at least one of the plungers in the second position engaging at least one of the ends of the gates.

22 Claims, 15 Drawing Sheets

(58) Field of Classification Search
CPC ........... F16H 59/0278; F16H 2061/242; F16H
2061/247; F16H 59/0217; F16H 59/08;
F16H 59/12; G05G 1/087; G05G 5/005;
G05G 5/14; G05G 5/18; G05G 1/02;
G05G 1/08; G05G 1/10; G05G 5/04;
G05G 5/06; G05G 5/08; G05G 5/12;
B60K 2350/102; Y10T 74/2084; H01H
19/00; H01H 19/03; H01H 19/0003
See application file for complete search history.

(56) References Cited

U.S. PATENT DOCUMENTS

| | | | |
|---|---|---|---|
| 3,873,916 A | 3/1975 | Sterki | |
| 4,154,125 A | 5/1979 | Frank | |
| 4,378,474 A | 3/1983 | Olson | |
| 4,386,312 A | 5/1983 | Briefer | |
| 4,859,922 A * | 8/1989 | Tauchenitz | G05G 1/10 310/93 |
| 5,012,056 A | 4/1991 | Abel et al. | |
| 5,161,422 A | 11/1992 | Suman et al. | |
| 5,189,355 A | 2/1993 | Larkins et al. | |
| 5,525,768 A | 6/1996 | Cobb, III et al. | |
| 5,576,704 A | 11/1996 | Baker et al. | |
| 5,598,153 A | 1/1997 | Brasseur et al. | |
| 5,862,715 A | 1/1999 | Lemire | |
| 5,884,528 A | 3/1999 | Ludanek et al. | |
| 5,998,743 A | 12/1999 | Unkel | |
| 6,046,673 A | 4/2000 | Michael et al. | |
| 6,060,671 A | 5/2000 | Mozer et al. | |
| 6,067,871 A | 5/2000 | Markyvech et al. | |
| 6,073,509 A | 6/2000 | Salecker et al. | |
| 6,295,887 B1 | 10/2001 | DeJonge et al. | |
| 6,366,442 B1 | 4/2002 | Onodera | |
| 6,404,354 B1 | 6/2002 | Decker et al. | |
| 6,474,186 B1 | 11/2002 | Vollmar | |
| 6,564,661 B2 | 5/2003 | DeJonge | |
| 6,629,473 B2 | 10/2003 | Syamoto et al. | |
| 6,661,114 B2 | 12/2003 | Syamoto | |
| 6,694,236 B2 | 2/2004 | Onodera | |
| 6,848,331 B2 | 2/2005 | Syamoto | |
| 6,848,332 B2 | 2/2005 | Hayashi et al. | |
| 6,874,382 B2 | 4/2005 | Danielsson et al. | |
| 6,933,933 B2 | 8/2005 | Fleming | |
| 6,948,398 B2 | 9/2005 | Dybro | |
| 7,029,420 B2 | 4/2006 | Sekino et al. | |
| 7,053,320 B2 | 5/2006 | Kodo et al. | |
| 7,167,085 B2 | 1/2007 | Meyer et al. | |
| 7,194,927 B2 | 3/2007 | Kozu et al. | |
| 7,302,762 B1 | 12/2007 | Ahn et al. | |
| 7,571,662 B2 | 8/2009 | Pickering et al. | |
| 7,571,663 B2 | 8/2009 | Vigil | |
| 7,602,376 B1 | 10/2009 | Hetherington | |
| 7,804,036 B2 * | 9/2010 | Ishigaki | B60K 37/06 200/336 |
| 7,869,925 B2 | 1/2011 | Pickering et al. | |
| 7,971,498 B2 * | 7/2011 | Meyer | B60K 37/06 200/19.18 |
| 8,000,864 B2 | 8/2011 | Rains | |
| 8,051,740 B2 * | 11/2011 | Giefer | B60K 37/06 74/473.21 |
| 8,125,445 B1 | 2/2012 | Anderson | |
| 8,170,757 B2 | 5/2012 | Fürhoff et al. | |
| 8,264,338 B2 | 9/2012 | Leon | |
| 8,281,681 B2 | 10/2012 | Kimulra et al. | |
| 8,336,418 B2 | 12/2012 | Giefer et al. | |
| 8,336,424 B2 | 12/2012 | Miret et al. | |
| 8,359,943 B2 | 1/2013 | Seki | |
| 8,364,342 B2 | 1/2013 | Springer et al. | |
| 8,423,232 B2 | 4/2013 | Tsutsumi et al. | |
| 8,504,266 B2 | 8/2013 | Jerger et al. | |
| 9,140,353 B2 | 9/2015 | Meyer et al. | |
| 9,372,498 B2 * | 6/2016 | Fust | G05G 1/02 |
| 2002/0014396 A1 | 2/2002 | Syamoto | |
| 2002/0016233 A1 | 2/2002 | Syamoto | |
| 2002/0080114 A1 * | 6/2002 | Numata | G05G 1/10 345/156 |
| 2002/0152827 A1 | 10/2002 | Hayashi et al. | |
| 2003/0098218 A1 | 5/2003 | Syamoto | |
| 2003/0178291 A1 | 9/2003 | Schilling | |
| 2004/0007450 A1 | 1/2004 | Kojima et al. | |
| 2004/0093968 A1 | 5/2004 | Oster | |
| 2004/0162661 A1 | 8/2004 | Kikuchi | |
| 2004/0186646 A1 | 9/2004 | Kuwata et al. | |
| 2004/0201465 A1 | 10/2004 | Meyer et al. | |
| 2004/0226801 A1 | 11/2004 | De Jonge et al. | |
| 2005/0145054 A1 | 7/2005 | Zann et al. | |
| 2005/0183523 A1 | 8/2005 | Kojima et al. | |
| 2005/0183537 A1 | 8/2005 | Kojima et al. | |
| 2005/0193859 A1 | 9/2005 | Kojima et al. | |
| 2006/0016287 A1 | 1/2006 | Grossman et al. | |
| 2006/0037424 A1 | 2/2006 | Pickering et al. | |
| 2006/0169085 A1 | 8/2006 | Peuster | |
| 2007/0261509 A1 | 11/2007 | Meyer et al. | |
| 2008/0028879 A1 | 2/2008 | Robinette et al. | |
| 2008/0115613 A1 | 5/2008 | Giefer et al. | |
| 2009/0000407 A1 | 1/2009 | Meyer et al. | |
| 2009/0049943 A1 | 2/2009 | Horneffer et al. | |
| 2009/0064809 A1 | 3/2009 | Miret et al. | |
| 2009/0107287 A1 | 4/2009 | Seki | |
| 2011/0040462 A1 | 2/2011 | Jerger et al. | |
| 2011/0169109 A1 | 7/2011 | Langereis | |
| 2011/0301818 A1 | 12/2011 | Hamade et al. | |
| 2012/0006139 A1 | 1/2012 | Kim | |
| 2012/0041655 A1 | 2/2012 | Thooris | |
| 2012/0291579 A1 | 11/2012 | Kamoshida | |
| 2013/0026026 A1 | 1/2013 | Nishijima | |
| 2013/0106794 A1 | 5/2013 | Logan et al. | |
| 2013/0145886 A1 | 6/2013 | Lee et al. | |
| 2013/0220055 A1 | 8/2013 | Curl | |
| 2013/0313086 A1 | 11/2013 | Redwood et al. | |
| 2014/0007726 A1 | 1/2014 | Muraki et al. | |
| 2014/0139240 A1 | 5/2014 | Burger | |
| 2014/0345409 A1 | 11/2014 | Watanabe | |
| 2015/0285351 A1 * | 10/2015 | Rake | G05G 1/08 74/436 |

FOREIGN PATENT DOCUMENTS

| | | | |
|---|---|---|---|
| DE | 19808665 C1 | 8/1999 | |
| DE | 10003140 C1 | 8/2001 | |
| DE | 10059794 A1 | 6/2002 | |
| DE | 10304804 A1 * | 8/2003 | ............... G05G 5/03 |
| DE | 102 17 614 A1 | 11/2003 | |
| DE | 102005001560 A1 | 7/2006 | |
| DE | 102005056992 A1 | 5/2007 | |
| DE | 102006042430 A1 * | 3/2008 | ............... B60K 37/06 |
| DE | 102008006061 A1 | 8/2008 | |
| DE | 10 2007 015 262 A1 | 10/2008 | |
| DE | 102008015613 A1 | 10/2009 | |
| DE | 102009057953 A1 | 6/2011 | |
| DE | 102012213860 A1 | 2/2014 | |
| EP | 0561378 A1 | 9/1993 | |
| EP | 1217496 A2 | 6/2002 | |
| EP | 1229272 A2 | 8/2002 | |
| EP | 0967418 B1 | 10/2002 | |
| EP | 1 362 734 A1 | 11/2003 | |
| EP | 1484661 A1 | 12/2004 | |
| EP | 2034383 A2 | 3/2009 | |
| EP | 2 159 455 A1 | 3/2010 | |
| EP | FR 2 935 454 A1 | 3/2010 | |
| EP | 2192469 A2 | 6/2010 | |
| EP | 2918964 A1 | 9/2015 | |
| FR | 2959034 A1 * | 10/2011 | ............... G05G 1/10 |
| GB | 2062875 A | 5/1981 | |
| GB | 2477134 A | 7/2011 | |
| JP | 2006177401 A | 7/2006 | |
| JP | 2008-044540 A | 2/2008 | |
| JP | 2008056164 A | 3/2008 | |
| JP | 4800800 B2 | 10/2011 | |
| SE | 514562 C2 | 3/2001 | |
| WO | WO 96/17365 A1 | 6/1996 | |
| WO | WO 2006/021198 A1 | 3/2006 | |
| WO | WO 2006/050702 A1 | 5/2006 | |

(56) References Cited

FOREIGN PATENT DOCUMENTS

| WO | 2008098773 A1 | 8/2008 |
|---|---|---|
| WO | WO 2008/098897 A2 | 8/2008 |
| WO | 2010103221 A1 | 9/2010 |
| WO | 2010136156 A1 | 12/2010 |
| WO | WO 2011/143178 A2 | 11/2011 |
| WO | WO 2012/064899 A1 | 5/2012 |
| WO | 2012110179 A2 | 8/2012 |

OTHER PUBLICATIONS

English language abstract for DE 102005056992 extracted from espacenet.com on Jun. 24, 2016, 1 page.

English language abstract for DE 102008015613 extracted from espacenet.com on Jun. 24, 2016, 1 page.

English language abstract for EP 2034383 extracted from espacenet.com on Jun. 24, 2016, 1 page.

Quoc, T. Vu, et al., "A printed circuit board capacitive sensor for air bubble inside fluidic flow detection," Microsyst. Technol. 21(4), pp. 911-918 (Apr. 2015) (published online Apr. 1, 2014).

English language abstract for CN 201198897 extracted from espacenet.com on Sep. 23, 2015, 1 page.

English language abstract for DE 10003140 extracted from espacenet.com on Sep. 22, 2015, 1 page.

English language abstract for DE 10059794 extracted from espacenet.com on Sep. 17, 2015, 1 page.

English language abstract for DE 19733609 extracted from espacenet.com on Sep. 17, 2015, 1 page.

English language abstract for DE 102005001560 extracted from espacenet.com on Sep. 17, 2015, 2 pages.

English language abstract for DE 102008006061 extracted from espacenet.com on Sep. 17, 2015, 1 page.

English language abstract for DE 102009057953 extracted from espacenet.com on Sep. 22, 2015, 1 page.

English language abstract for DE 102012213860 extracted from espacenet.com on Sep. 17, 2015, 1 page.

English language abstract for EP 1484661 extracted from espacenet.com on Sep. 17, 2015, 1 page.

English language translation of the application for EP 1484661 prepared by Language Arts and Sciences, 10 pages.

English language abstract for JP 4800800 extracted from espacenet.com on Sep. 22, 2015, 1 page.

English language abstract for JP 2006177401 extracted from espacenet.com on Sep. 22, 2015, 1 page.

English language abstract for JP 2008056164 extracted from espacenet.com on Sep. 22, 2015, 2 pages.

English language abstract for SE 514562 extracted from espacenet.com on Sep. 17, 2015, 1 page.

English language abstract and computer-generated English language translation for DE 102 17 614 extracted from espacenet.com database on Jul. 28, 2016, 9 pages.

English language abstract for DE 10 2007 015 262 extracted from espacenet.com database on Jul. 28, 2016, 2 pages.

English language abstract and computer-generated English language translation for EP 2 159 455 extracted from espacenet.com database on Jul. 28, 2016, 21 pages.

English language abstract and computer-generated English language translation for FR 2 935 454 extracted from espacenet.com database on Jul. 28, 2016, 11 pages.

English language abstract and computer-generated English language translation for JP 2008-044540 extracted from espacenet.com database on Jul. 28, 2016, 29 pages.

English language abstract and computer-generated English language translation for WO 96/17365 extracted from espacenet.com database on Jul. 28, 2016, 11 pages.

English language abstract for WO 2006/021198 extracted from espacenet.com database on Jul. 28, 2016, 2 pages.

English language abstract for WO 2006/050702 extracted from espacenet.com database on Jul. 28, 2016, 2 pages.

English language abstract and computer-generated English language translation for WO 2008/098897 extracted from espacenet.com database on Jul. 28, 2016, 8 pages.

\* cited by examiner

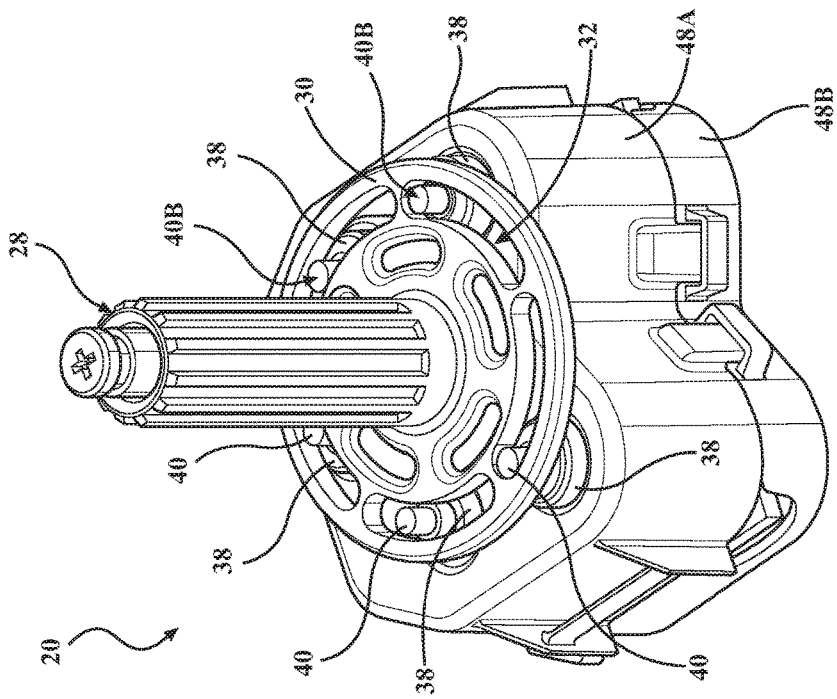
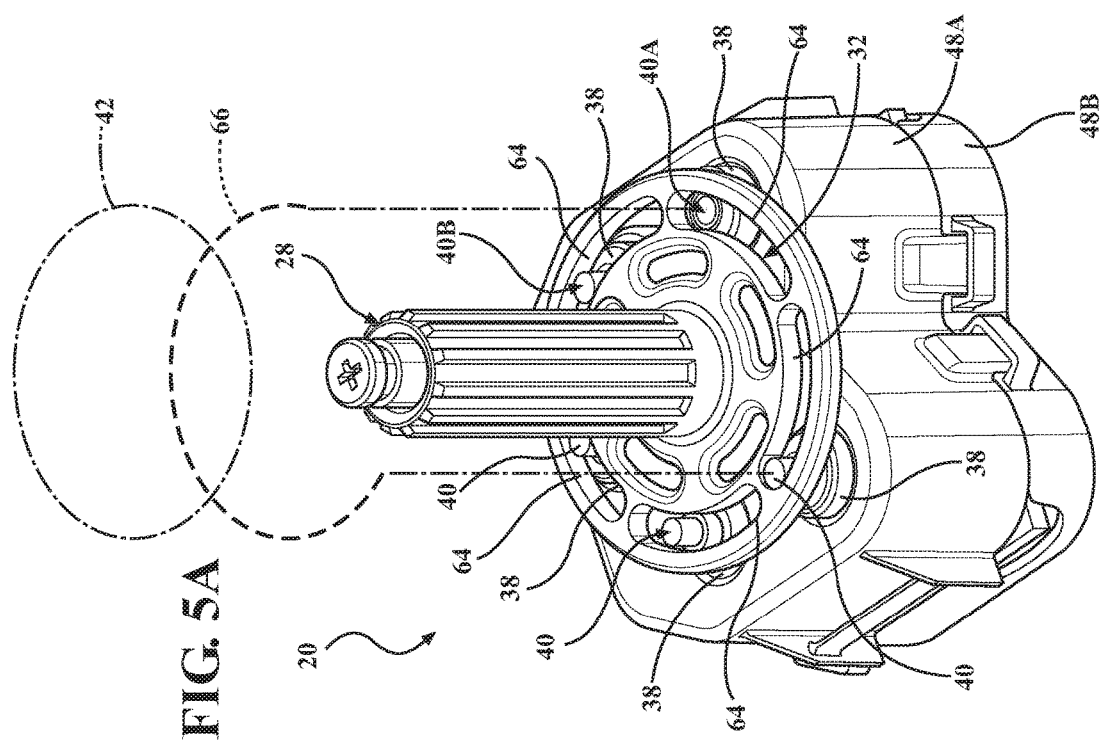
FIG. 5A
FIG. 5B

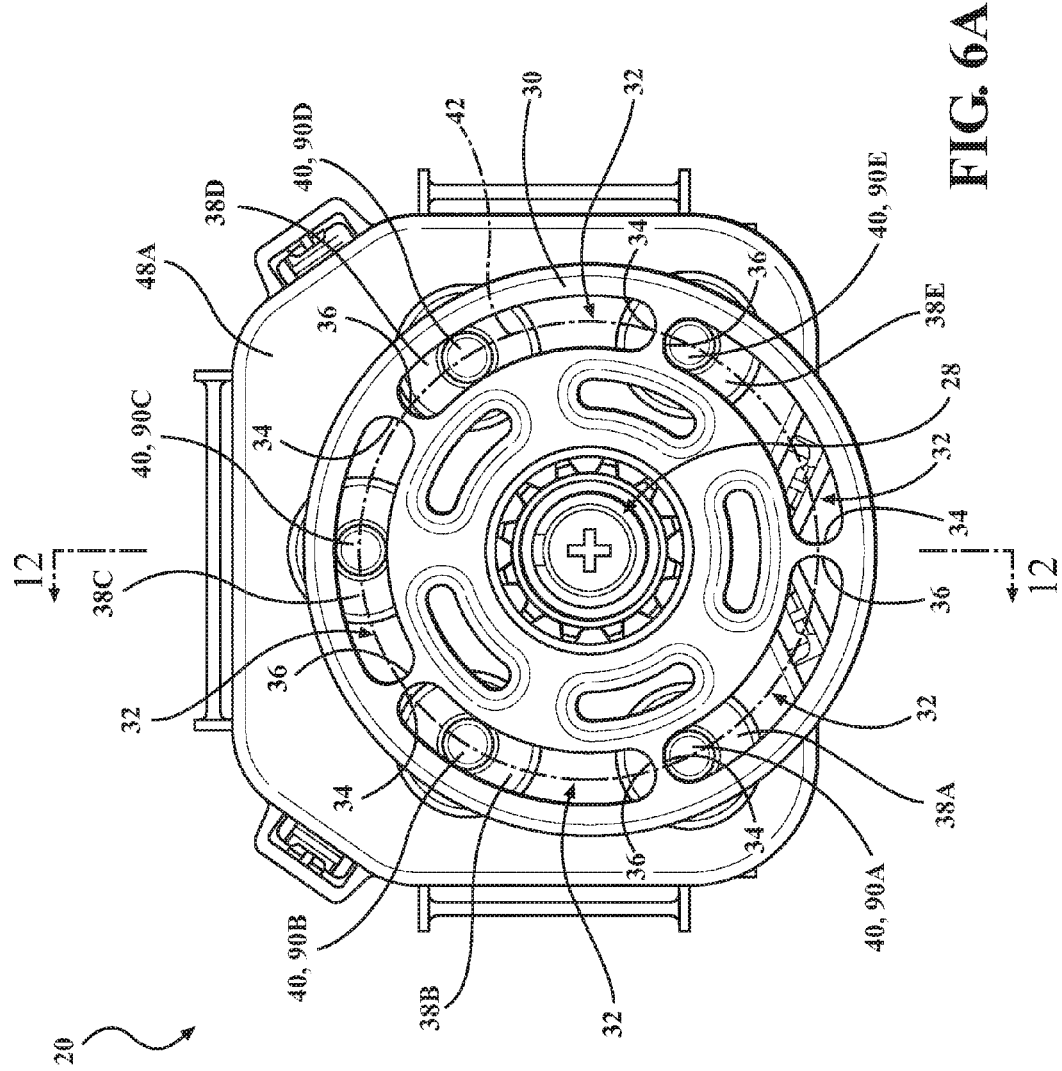

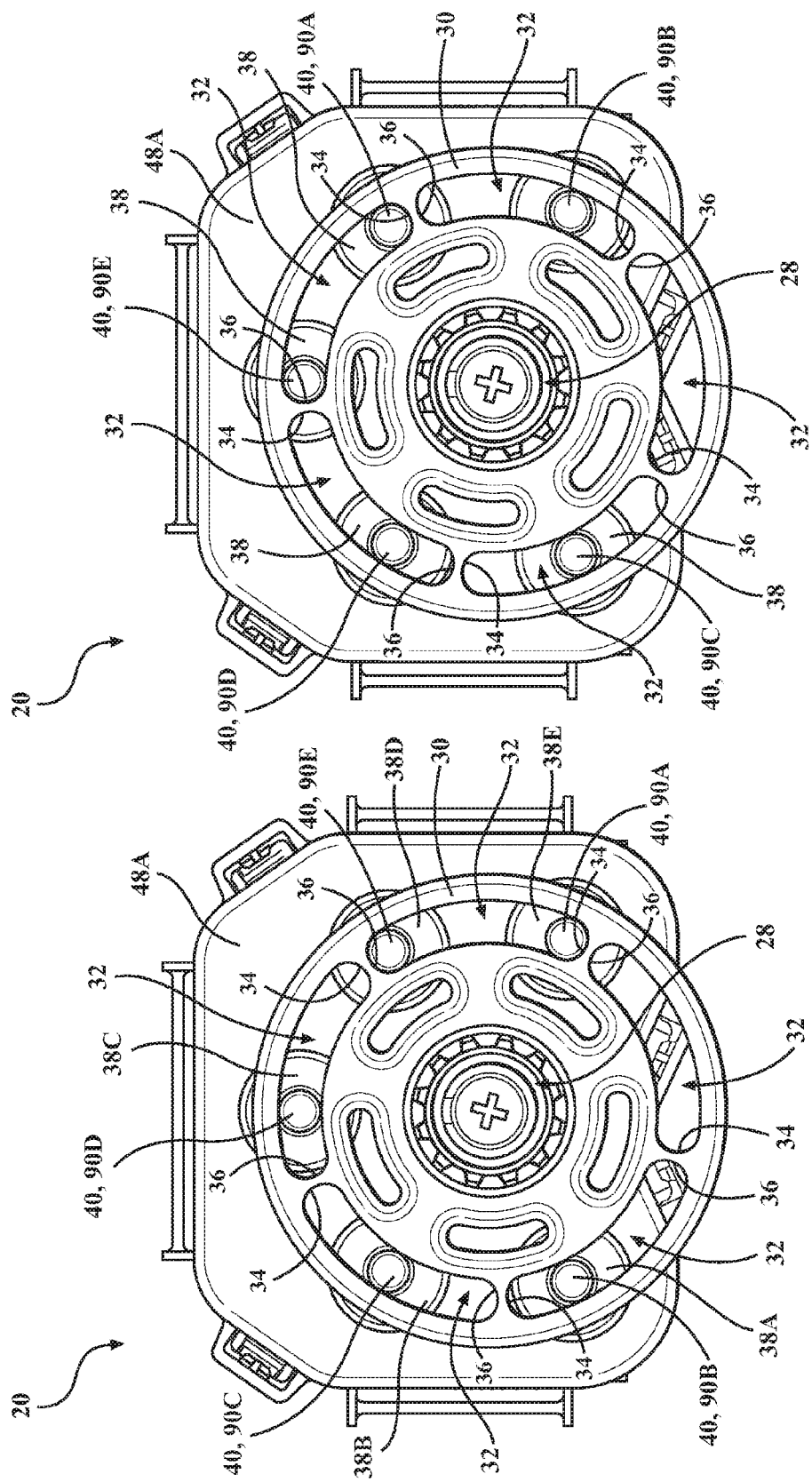

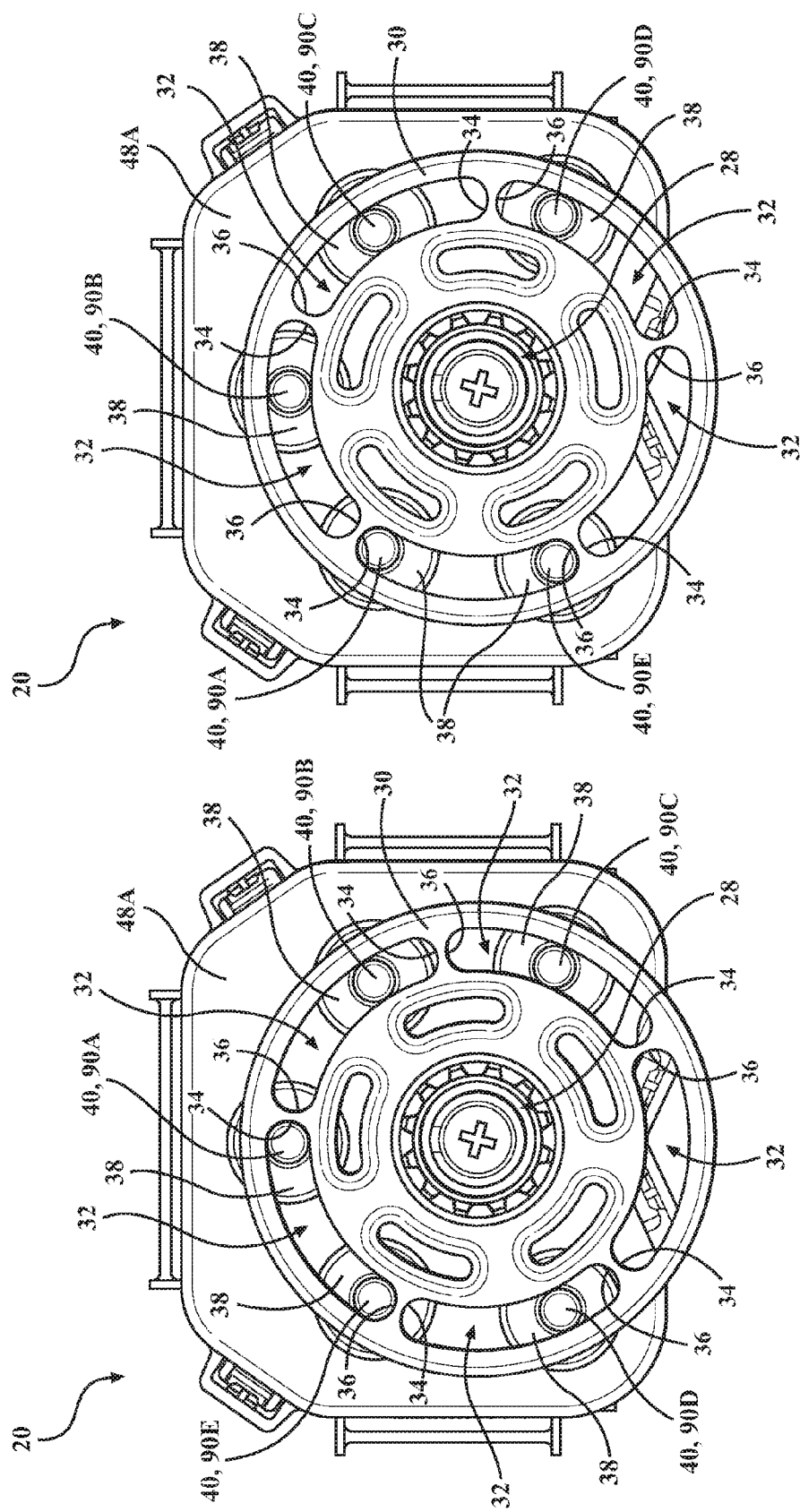

ROTARY SHIFTER ASSEMBLY

BACKGROUND OF THE INVENTION

1. Field of the Invention

The present invention relates, generally, to automotive transmission systems and, more specifically, to a rotary shifter assembly for changing gears in a vehicle transmission.

2. Description of the Related Art

Conventional automotive powertrain systems known in the art include an engine in rotational communication with a transmission. The engine generates rotational torque which is selectively translated to the transmission which, in turn, translates rotational torque to one or more wheels. The transmission multiplies the rotational speed and torque generated by the engine through a series of predetermined gear sets, whereby changing between gear sets enables a vehicle to travel at different vehicle speeds for a given engine speed. Thus, the gear sets of the transmission are configured such that the engine can operate at particularly desirable rotational speeds so as to optimize performance and efficiency.

There are a number of different types of automotive transmissions known in the art. As such, changing between gear sets can be accomplished in a number of different ways, depending on the type of transmission. For example, so-called "manual" transmission systems typically include a clutch disposed between the engine and transmission for modulating engagement therebetween, and a shifter for changing between gear sets. The clutch and shifter are both mechanically connected to the manual transmission and are driver-actuated. In operation, the driver can manipulate the clutch and shifter to move the transmission between a freewheel "neutral" configuration, a "reverse" gear, and one or more forward gears, such as "first," "second," "third," "forth," etc. Thus, the driver determines when to change between gear sets and operates the shifter and clutch "manually".

So-called "automatic" transmission systems, on the other hand, require substantially less driver input and use an electronic transmission controller that drives one or more solenoids to effect changing between forward gear sets. Solenoids are also used to modulate engagement between the engine and transmission. In conventional automatic transmission systems, modulation is achieved using a hydraulic torque converter. However, modern transmission systems may replace the torque converter with one or more electronically and/or hydraulically actuated clutches (sometimes referred to in the art as a "dual clutch" automatic transmission). In addition, conventional manual transmissions may be automated, whereby electronic actuators are used to shift between gear sets and modulate the clutch without relying on exclusively on operator interaction. Irrespective of how modulation is effected, automatic transmission systems rely on the transmission controller to determine when to change between forward gear sets. Thus, the transmission controller "automatically" modulates engagement between the engine and transmission and shifts between forward gear sets.

Despite the convenience afforded by automatic transmission systems in changing between forward gear sets, driver interaction is still required to select between different vehicle operating modes, such as "park," "reverse," "neutral," "drive," and/or "sport/manual." To that end, the automatic transmission system also includes a shifter assembly in communication with the transmission and/or transmission controller.

Historically, shifter assemblies used with automatic transmissions were mechanically connected to the transmission via one or more linkages and/or cables. However, given the trend in the art of utilizing electronic actuators to control automatic transmission systems, modern shifter assemblies are increasingly designed as "drive-by-wire" so as to control the transmission electronically and without mechanical linkages and/or cables. By eliminating mechanical linkages and cables connected to the transmission, electronic shifter assemblies provide significant advantages with respect to packaging size, weight, orientation, and placement within the vehicle. Moreover, electronic shifter assemblies provide opportunities for controlling transmission systems with enhanced functionality and features.

While shifter assemblies known in the prior art have generally performed well for their intended purpose, there remains a need in the art for an improved electronic shifter assembly that strikes a substantial balance between packaging size, component cost, manufacturability, functionality, usability, and ergonomics.

SUMMARY OF THE INVENTION AND ADVANTAGES

The present invention overcomes the disadvantages in the related art in a shifter assembly for changing gears in a vehicle transmission. The shifter assembly includes a housing and a shift rod rotatably supported in the housing. The shift rod is selectively movable between a plurality of radial positions. The shifter assembly also includes a disc in rotational communication with the shift rod for concurrent movement with the shift rod between the radial positions. The disc defines a plurality of gates each having respective first and second ends. The shifter assembly also includes plurality of solenoids disposed in the housing adjacent the disc. Each of the solenoids has a plunger selectively movable between a first position spaced from the disc and a second position disposed within one of the gates. The gates are spaced equally from each other and are radially aligned about a common reference circle. Rotation of the shift rod is selectively limited by at least one of the plungers in the second position engaging at least one of the ends of the gates.

In this way, the shifter assembly of the present invention provides improved functionality and usability in connection with automatic transmission systems and, at the same time, reduces the cost and complexity of manufacturing and assembling shifter assemblies.

BRIEF DESCRIPTION OF THE DRAWINGS

Other advantages of the present invention will be readily appreciated, as the same becomes better understood by reference to the following detailed description when considered in connection with the accompanying drawings.

FIG. 5A is a perspective view of the shifter subassembly of FIGS. 2-4 showing a solenoid in a first configuration.

FIG. 5B is an alternate perspective view of the shifter subassembly of FIG. 5 showing the solenoid in a second configuration.

FIG. 6A is a front plan view of the shifter subassembly of FIGS. 2-5B showing a shift rod assembly in a first radial position.

FIG. 6B is a front plan view of the shifter subassembly of FIG. 6A showing the shift rod assembly a second radial position.

FIG. 6C is a front plan view of the shifter subassembly of FIG. 6A showing the shift rod assembly in a third radial position.

FIG. 6D is a front plan view of the shifter subassembly of FIG. 6A showing the shift rod assembly in a fourth radial position.

FIG. 6E is a front plan view of the shifter subassembly of FIG. 6A showing the shift rod assembly in a fifth radial position.

DETAILED DESCRIPTION OF THE INVENTION

Figure 1:
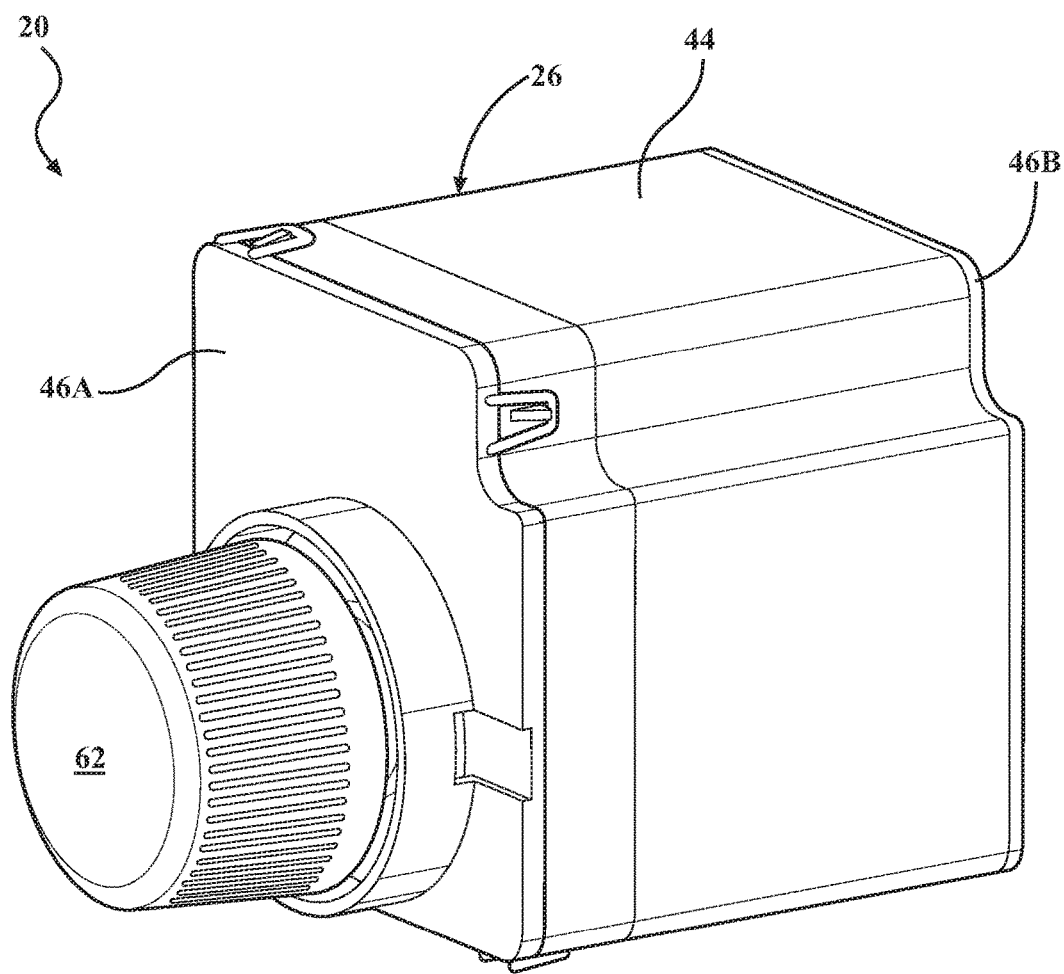
FIG. 1 is a perspective view of a shifter assembly according to one embodiment of the present invention.

With reference now to the Figures, wherein like numerals indicate like parts throughout the several views, a shifter assembly is shown at 20 in FIG. 1. The shifter assembly 20 is used to change gears in a vehicle transmission 22. More specifically, the shifter assembly 20 cooperates with an automatic transmission 22 (shown schematically in FIG. 9 and generally known in the art) of a vehicle so as to enable a driver to operate the transmission 22 in a plurality of vehicle operating modes, such as "park," "neutral," "reverse," "drive," and "sport." To that end, the shifter assembly 20 is in electrical communication with one or more electronic control units 24 (shown schematically in FIG. 9 and generally known in the art), such as an engine or transmission controller which, in turn, is responsive to predetermined signals generated by the shifter assembly 20 and can subsequently control the automatic transmission 22 as required.

The electronic control unit 24 drives one or more actuators, such as solenoids (not shown, but generally known in the art) to control the transmission 22. Specifically, the electronic control unit 24 drives the actuators so as to switch the automatic transmission 22 between the vehicle operating modes, as selected by the driver. The electronic control unit 24 also moves the automatic transmission 22 between a plurality of predetermined transmission gear sets when the shifter assembly 20 is in the "drive" operating mode. However, those having ordinary skill in the art will appreciate that the shifter assembly 20 of the present invention could be used in connection with an automatic transmission 22 controlled in any suitable way, with or without an electronic control unit 24 or actuators as described above, without departing from the scope of the present invention. Moreover, it will be appreciated that the shifter assembly 20 of the present invention can be used in connection with any suitable type of transmission 22. By way of non-limiting example, the transmission 22 could be a conventional automatic that employs a torque converter, a modern automatic that employs one or more electronically and/or hydraulically actuated clutches, or a conventional manual with an automatically actuated clutch.

As noted above, the shifter assembly 20 is adapted to control the automatic transmission 22 between a plurality of operating modes—in the representative embodiment illustrated herein, five different modes. However, as will be appreciated from the subsequent description of the shifter assembly 20 below, the present invention could also control other types of vehicle systems, between any suitable number of discrete operating modes. By way of non-limiting example, the shifter assembly 20 could be used to control transfer case assemblies, all-wheel-drive systems, differential torque biasing systems, or any other type of automotive system or sub-system, without departing from the scope of the present invention. Moreover, while the present invention is adapted for use with automotive passenger vehicles, it will be appreciated that the shifter assembly 20 could be used in connection with any type of vehicle, such as heavy-duty trucks, trains, airplanes, ships, construction vehicles or equipment, military vehicles, or any other type of vehicle that utilizes an automatic transmission or torque transfer system.

Referring now to FIGS. 2-7, the shifter assembly 20 of the present invention includes a housing 26 and a shift rod 28 rotatably supported in the housing 26. The shift rod 28 is selectively moveable between a plurality of radial positions. The shifter assembly 20 also includes a disc 30 in rotational communication with the shift rod 28 for concurrent movement with the shift rod 28 between the radial positions. The disc 30 defines a plurality of gates 32 each having respective first and second ends 34, 36 (see FIGS. 6A-7). A plurality of solenoids 38 are disposed in the housing 26 adjacent to the disc 30 (see FIG. 4). Each of the solenoids 38 has a plunger 40 that is selectively moveable between a first position 40A spaced from the disc 30 (see FIG. 5A), and a second position 40B disposed within one of the gates 32 (see FIG. 5B). The gates 32 are spaced equally from each other and are radially aligned about a common reference circle, indicated illustratively at 42 (see FIGS. 5A and 6A). Rotation of the shift rod 28 is selectively limited by at least one of the plungers 40 in the second position 40B engaging at least one of the ends 34, 36 of the gates 32. The housing 26, shift rod 28, disc 30, gates 32, and solenoids 38 will be described in greater detail below.

The housing 26 is formed from a plurality of elements that interlock or otherwise cooperate to accommodate and support the various components of the shifter assembly 20. As illustrated throughout the Figures, the housing 26 includes a main housing body 44, front and rear covers 46A, 46B, and a pair of interlocking cartridge elements 48A, 48B. This configuration simplifies both the manufacturing and assembly of the shifter assembly 20 and also optimizes the overall packaging size of the shifter assembly 20. However, it will be appreciated that the housing 26 could be formed from any suitable number of elements, or from a single element, without departing from the scope of the present invention.

Figure 2:
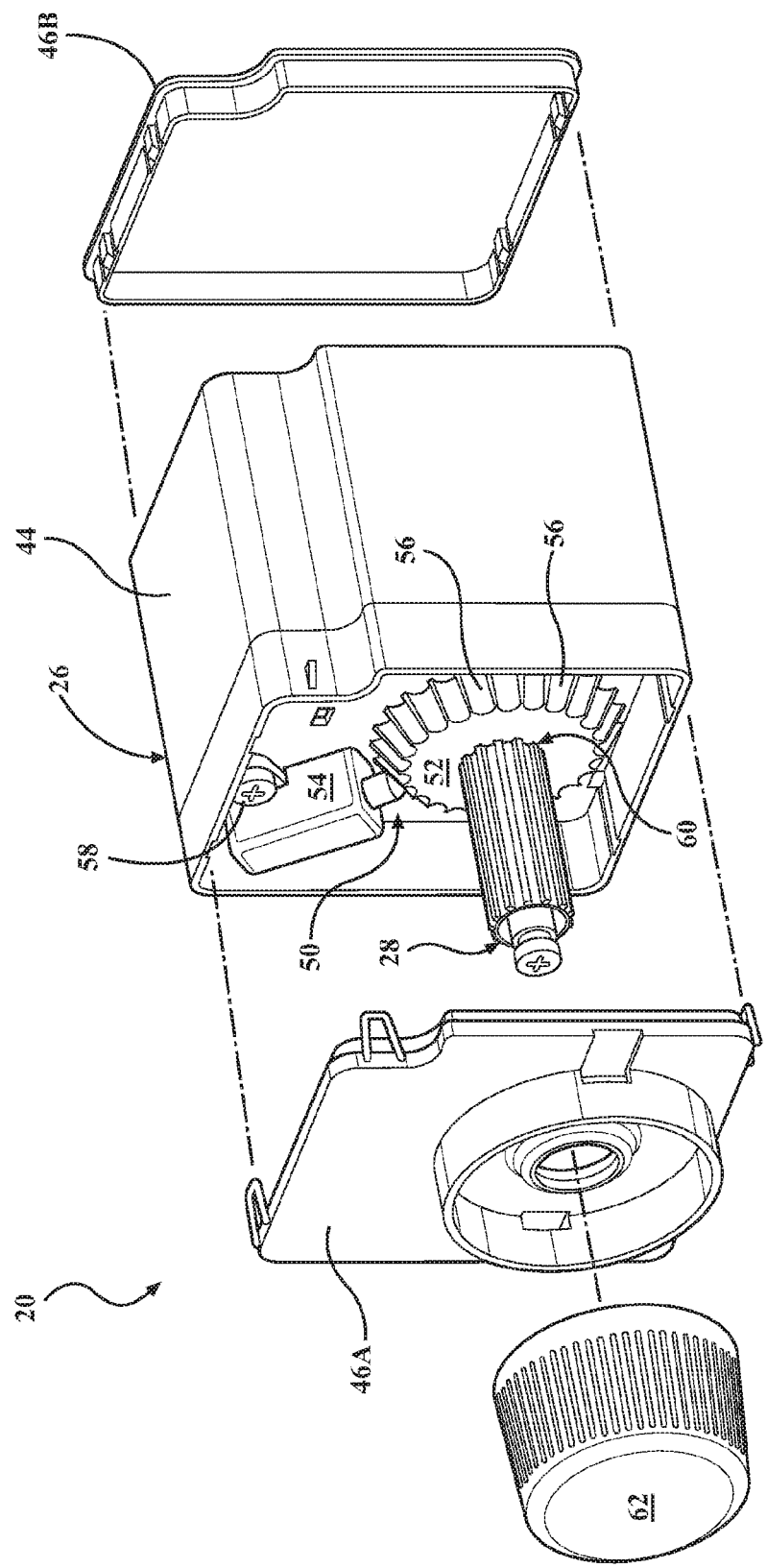
FIG. 2 is a partially exploded perspective view of the shifter assembly of FIG. 1, showing a knob, a main housing with a shifter subassembly and a detent mechanism, and a pair of main housing covers.
Figure 3:
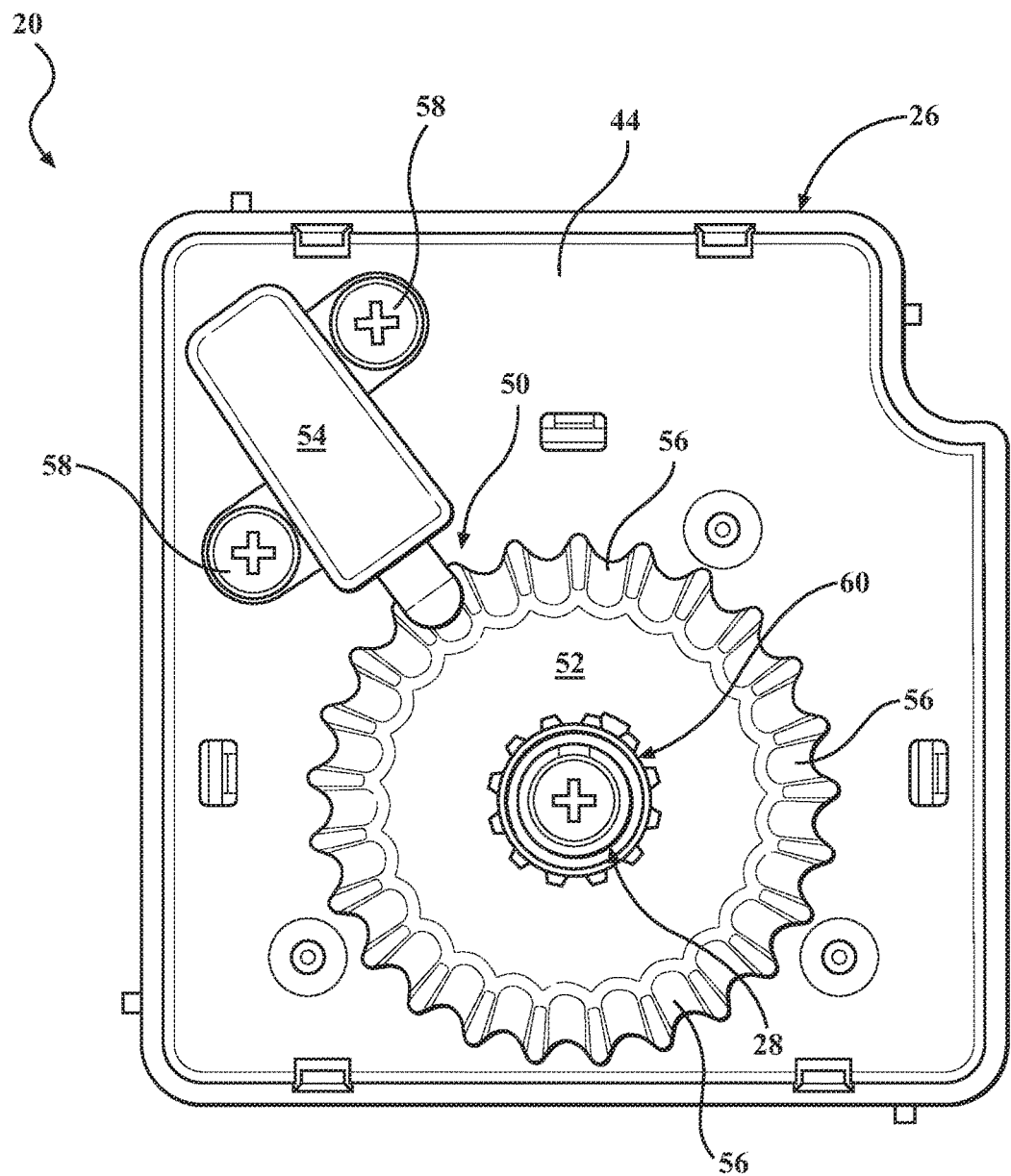
FIG. 3 is a front plan view of the main housing, shifter subassembly, and detent mechanism of FIG. 2.
Figure 4:
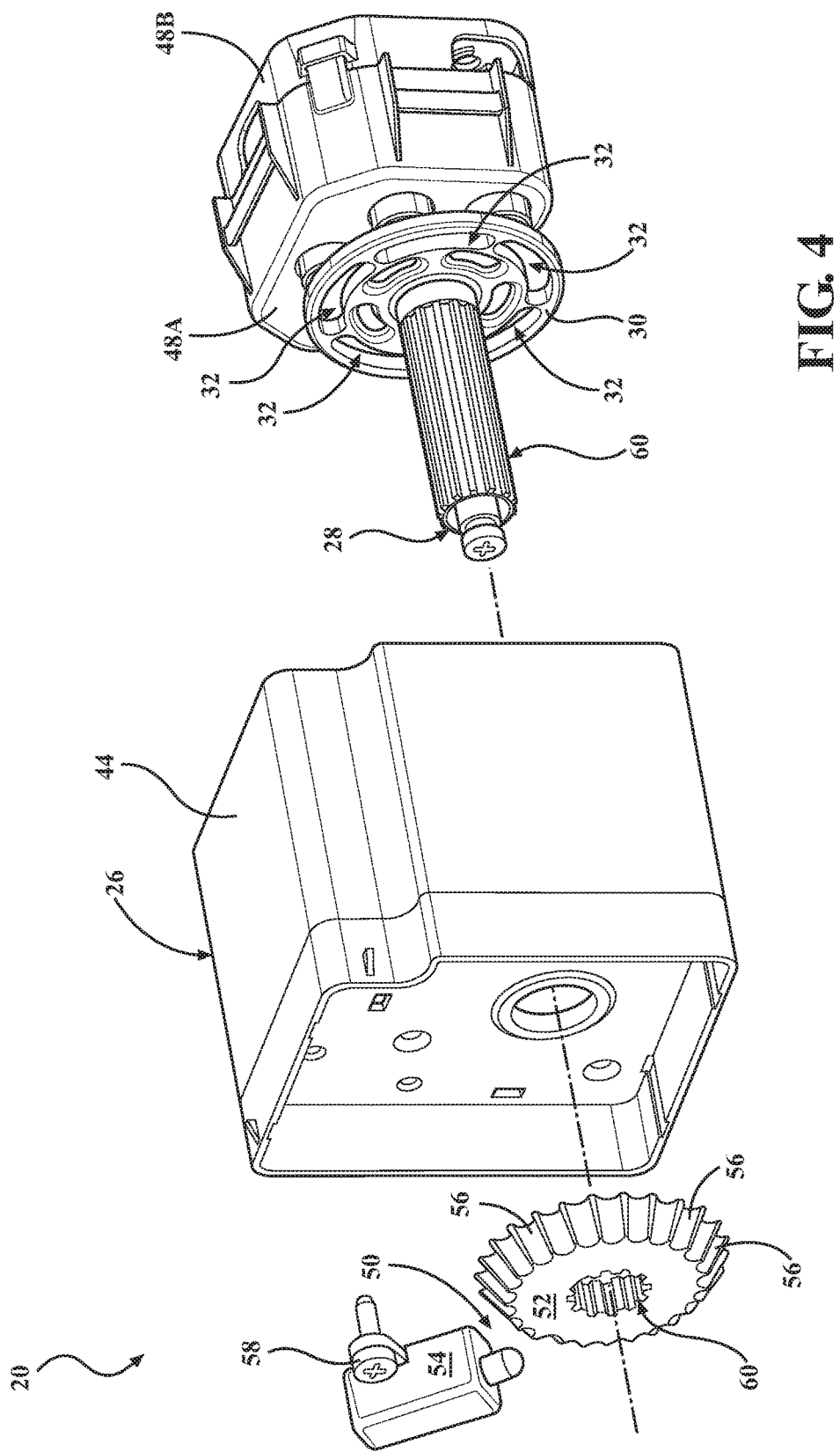
FIG. 4 a partially exploded perspective view of the shifter subassembly, main housing, and detent mechanism of FIGS. 2 and 3.

As shown in FIGS. 2 and 3, in one embodiment, the shifter assembly 20 includes a detent mechanism, generally indicated at 50, that cooperates with the shift rod 28 so as to define the plurality of radial positions. To that end, the detent mechanism 50 includes a detent wheel 52 and a spring-loaded detent plunger 54. The detent wheel 52 is in rotational communication with the disc 30 and has a plurality of radially-spaced detents 56 each representing respective radial positions of the shift rod 28. The spring-loaded detent plunger 54 selectively engages one of the detents 56 so as to at least partially resist rotation of the shift rod 28. Thus, the detent plunger 54 holds the shift rod 28 in the respective radial position of the shift rod 28 until the driver applies enough rotational torque to overcome the detent plunger 54 and move to the adjacent radial position. In the representative embodiment illustrated herein, the detent wheel 52 includes twenty-five detents 56 each having a curved, tapered, and angled profile (see FIG. 2). However, those having ordinary skill in the art will appreciate that the detent wheel 52 could have any number of detents 56 with any suitable shape, profile, or configuration, without departing from the scope of the present invention. Moreover, while a single detent mechanism 50 with a single detent plunger 54 is utilized in the representative embodiment illustrated herein, those having ordinary skill in the art will appreciate that any suitable number of detent mechanisms 50, configured in any suitable way, could be utilized without departing from the scope of the present invention. By way of non-limiting example, a plurality of detent plungers 54 could be utilized.

As shown best in FIG. 3, the spring-loaded detent plunger 54 is operatively attached to the housing 26. More specifically, the spring-loaded detent plunger 54 is fixed to the main housing body 44 of the housing 26 by a pair of screws 58 and is concealed by the front cover 46A (compare FIGS. 1 and 2). However, it will be appreciated that the detent plunger 54 could be operatively attached to any part of the shifter assembly 20, in any suitable way sufficient to engage the detent wheel 52 as discussed above, without departing from the scope of the present invention.

As noted above, the detent wheel 52 is in rotational communication with the disc 30, whereby rotation of the disc 30 is concurrent with rotation of the detent wheel 52. In the representative embodiment illustrated herein, the detent wheel 52 is mounted to the shift rod 28 which, in turn, is directly fixed to and concentrically aligned with the disc 30 for direct movement with the disc 30. Specifically, the disc 30 is formed integrally with the shift rod 28, and the detent wheel 52 and shift rod 28 are mounted to one another via a spline arrangement, generally indicated at 60. The spline arrangement 60 simplifies the process of assembling the shifter assembly 20 and, at the same time, ensures angular correspondence between the detent wheel 52 and the shift rod 28. Moreover, the spline arrangement 60 ensures angular correspondence between the detent wheel 52 and the gates 32 of the disc 30. However, it will be appreciated that the shift rod 28, disc 30, and detent wheel 52 could be formed from any number of components that cooperate or interlock in any suitable way, with or without the use of the spline arrangement 60, without departing from the scope of the present invention.

In the representative embodiment of the shifter assembly 20 illustrated throughout the FIGS., the shift rod 28, the disc 30, and the detent wheel 52 are all concentrically aligned with one another and rotate together in response to rotational torque applied to the shift rod 28 from the driver during selection of the transmission 22 operating mode, as discussed above. To that end, in one embodiment, the shifter assembly 20 also includes a knob 62 attached to the shift rod 28 (see FIGS. 1 and 2). In operation, the driver rotates the knob 62 which, in turn, rotates the shift rod 28, the disc 30, and the detent wheel 52. While the shift rod 28, disc 30, detent wheel 52, and knob 62 are all concentrically aligned about a common rotational axis, it will be appreciated that the shift rod 28, disc 30, and/or knob 62 could be oriented differently with respect to each other and/or the detent wheel 52 without departing from the scope of the present invention. By way of non-limiting example, the knob 62, shift rod 28, and disc 30 could be spaced from the detent wheel 52, and the shifter assembly 20 could employ a geartrain (not shown, but generally known in the art) to effect rotational communication between the disc 30 and detent wheel 52. Similarly, the knob 62 could be spaced from and be in rotational communication with the shift rod 28 without departing from the scope of the present invention.

As noted above and illustrated in FIGS. 5A and 6A, the gates 32 of the disc 30 are spaced equally from each other and are radially aligned about the common reference circle 42. In one embodiment, the common reference circle 42 is defined concentrically with at least one of the shift rod 28 and the disc 40. However, those having ordinary skill in the art will appreciate that the common reference circle 42 could be defined in any suitable way without departing from the scope of the present invention. In one embodiment, and as illustrated throughout the Figures, the gates 32 are further defined as arcuate slots 64 formed in the disc 30 (see FIGS. 5A and 10). The arcuate slots 64 are equidistantly spaced about the common reference circle 42, have a closed periphery, and are configured to accommodate the plungers 40 of the solenoids 38, as described in greater detail below. However, it will be appreciated that the gates 32 could be configured or otherwise defined in any way suitable to accommodate the plungers 40 of the solenoids 38, with or without the use of slots 64, without departing from the scope of the present invention. Thus, the gates 32 may be defined between any suitable portion or feature of the disc 30 that defines the first and second ends 34, 36.

Figure 7:
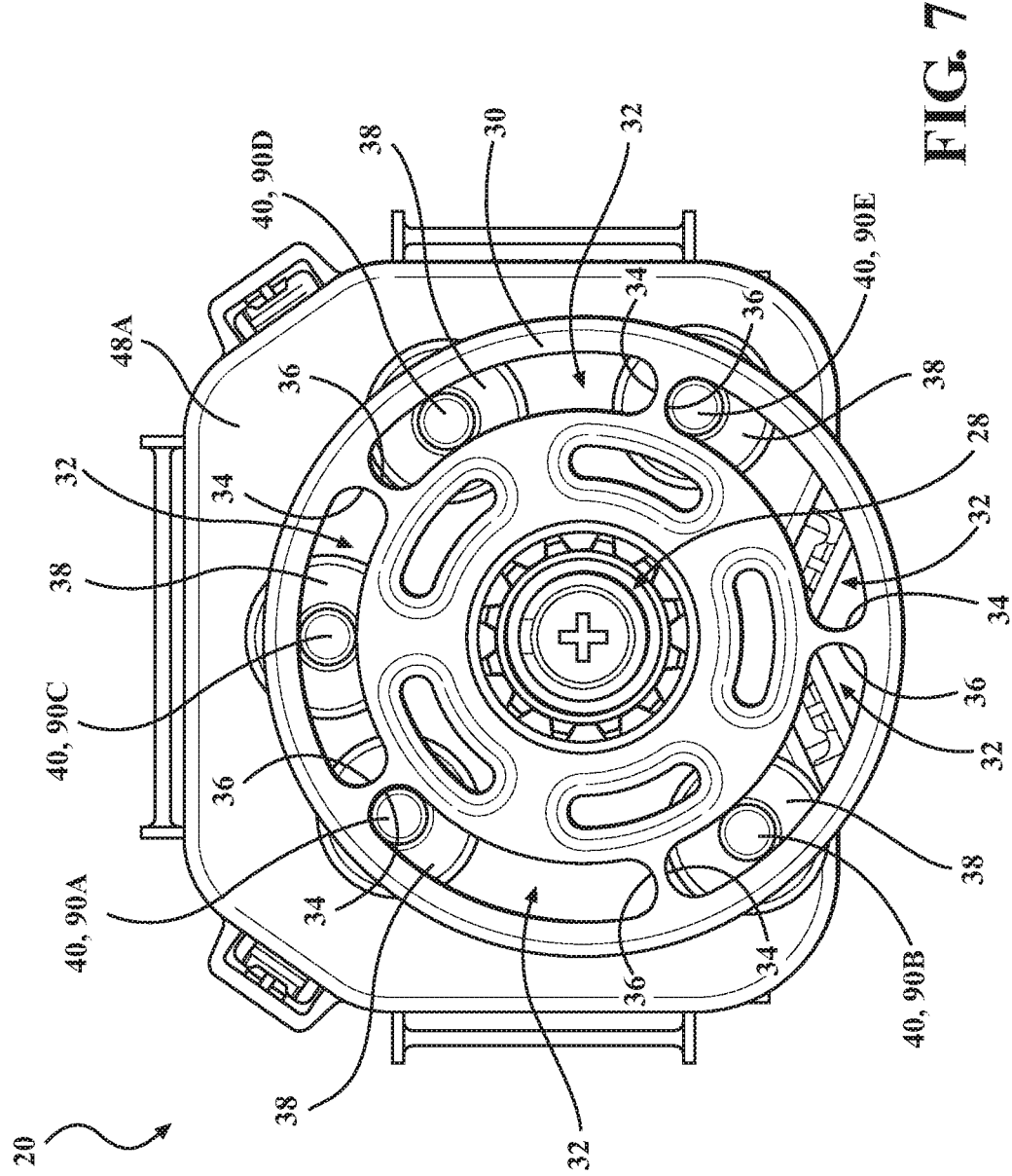
FIG. 7 is a front plan view of an alternate embodiment of the shifter subassembly of FIG. 6A.
Figure 8:
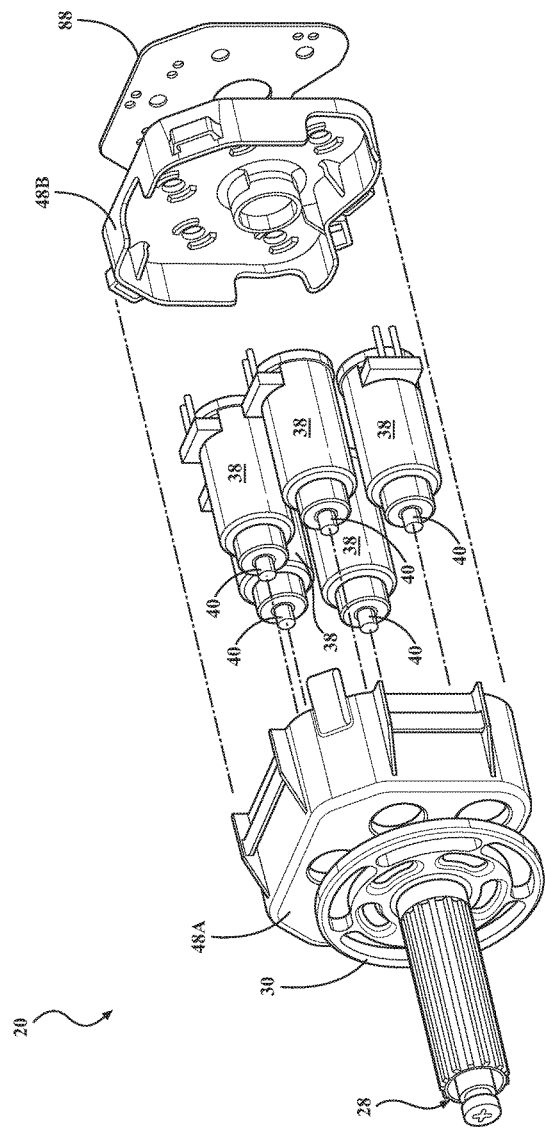
FIG. 8 is a partially exploded view of the shifter subassembly of FIGS. 2-6E showing the shift rod assembly, solenoids, a cartridge, and a cartridge cover.

Referring now to FIGS. 5A-9, as noted above, the shifter assembly 20 of the present invention includes a plurality of solenoids 38 are disposed in the housing 26 adjacent to the disc 30. More specifically, the solenoids 38 are secured between the cartridge elements 48A, 48B (see FIG. 8) which, in turn, are disposed in the main housing body 44 of the housing 26. However, those having ordinary skill in the art will appreciate that the solenoids 38 could be secured differently, with or without the use of the cartridge elements 48A, 48B, without departing from the scope of the present invention. The solenoids 38 are electromagnetically actuated by electric current so as to selectively move the plungers 40 of the respective solenoids 38 between the positions 40A, 40B, as discussed above. To that end, the solenoids 38 are in electrical communication with and are actuated by the electronic control unit 24 (not shown in detail, but generally known in the art). However, it will be appreciated that the solenoids 38 could be of any suitable type sufficient to move plungers 40 into the gates 32, and could be actuated in any suitable way, without departing from the scope of the present invention As illustrated in FIGS. 5A-6E, in one embodiment, the solenoids 38 are equally spaced along an imaginary arc 66 (see FIG. 5A) which, in turn, is concentrically aligned with the common reference circle 42. Thus, the solenoids 38 are radially spaced about the common reference circle 42 such that the plungers 40 can engage in the actuate slots 64 of the gates 32. However, as shown in FIG. 7, the solenoids 38 could be unequally spaced about the common reference circle 42 and/or the arc 66 without departing from the scope of the present invention. As illustrated throughout the Figures, all of the solenoids 38 are spaced radially from the shift rod 28 at an equal distance, and the plungers 40 of the solenoids 38 are all aligned so to be substantially parallel to the shift rod 28. However, it will be appreciated that the solenoids 38 could be spaced, configured, or otherwise oriented differently with respect to each other and/or the shift rod 28 without departing from the scope of the present invention. By way of non-limiting example, it is conceivable that the plungers 40 could be aligned tangentially with the shift rod 28.

In one embodiment, the shifter assembly 20 includes G gates 32 and S solenoids 38, where "G" refers to the quantity of the plurality of gates 32 and "S" refers to the quantity of the plurality of solenoids 38. As shown in the embodiment of FIGS. 6A-6E, the disc 30 includes a total of five gates 32, and a total of five solenoids 38 are equally spaced along the arc 66. The arc 66 has an arc angle AA, which is equal to $360-[((S-1)/S)*(360/G)]$. Thus, in this embodiment of the present invention, AA=302.4 degrees. Further, in one embodiment, the shift rod 28 is selectively moveable between N radial positions, wherein N is equal to $[(G)*(S)]$. Thus, in this embodiment of the present invention, N=25 radial positions. However, while G is equal to S in this embodiment, it will be appreciated that any suitable number of solenoids 38 and/or gates 32 could be used without departing from the scope of the present invention. By way of non-limiting example, G could be either greater than or smaller than S.

Referring now to FIGS. 8-13, in one embodiment of the present invention, the shifter assembly 20 also includes a biasing mechanism 68 interposed between the shift rod 28 and the housing 26 for urging the shift rod 28 axially away from the housing 26 toward a first axial position 28A. The shift rod 28 is moveable from the first axial position 28A (see FIG. 12) to a second axial position 28B (see FIG. 13) in response to and in the direction of axial force selectively applied to the shift rod 28. As shown best in FIG. 11, the biasing mechanism 68 includes a compression spring 70, a lever 72, a pin 74, and a bias shaft 76 that cooperate with the shift rod 28 to urge the shift rod 28 away axially away from the housing 26. However, those having ordinary skill in the art will appreciate that the biasing mechanism 68 could be configured differently, or omitted entirely, without departing from the scope of the present invention. In the representative embodiment illustrated throughout the Figures, the shift rod 28 has an inner chamber 78 defined axially along its length, as well as a pair of slots 80 in communication with the inner camber 78 defined tangentially with respect thereto. The bias shaft 76 is at least partially disposed in the inner chamber 78 of the shift rod 28. The knob 62 is operatively attached to the bias shaft 76 for concurrent radial movement therewith. The bias shaft 76 also includes a pin bore 82 defined therein. The pin 74 extends through the pin bore 82 of the bias shaft 76, rides in the slots 80 of the shift rod 28, and abuts against the lever 72 (see FIGS. 10 and 12). Thus, the pin 74 enables rotation of the bias shaft 76 via the knob 62 to be translated to the shift rod 28. Further, the pin 74 also enables axial translation of the bias shaft to be translated to the lever 72. The spring 70 is interposed between one of the cartridge elements 48B and the lever 72, and urges the lever 72 axially away from the housing 26 and against the pin 74. Thus, the shift rod 28 is moveable between the plurality of radial positions in either of the axial positions 28A, 28B.

Figure 10:
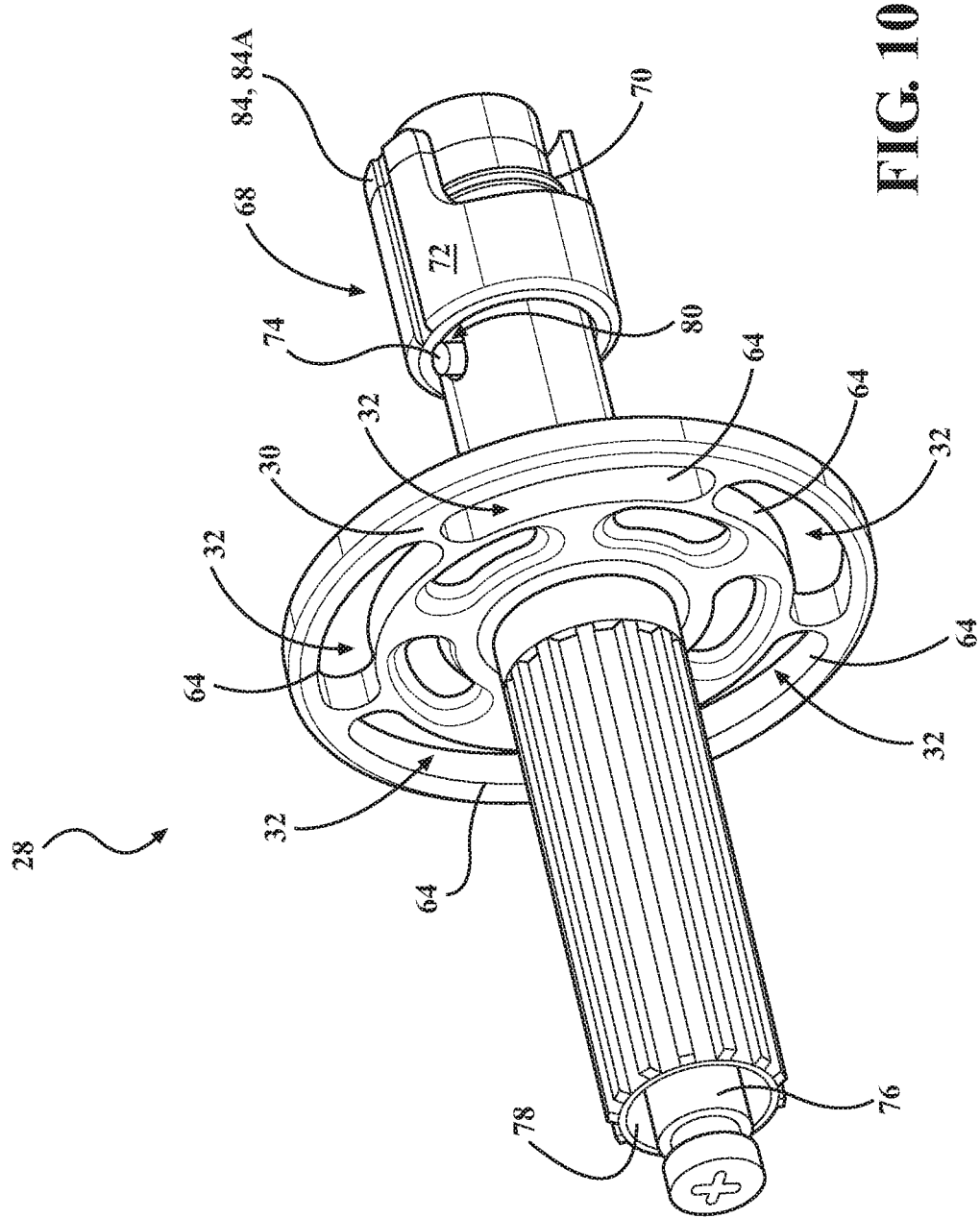
FIG. 10 is a perspective view of the shift rod assembly of FIGS. 8 and 9.
Figure 11:
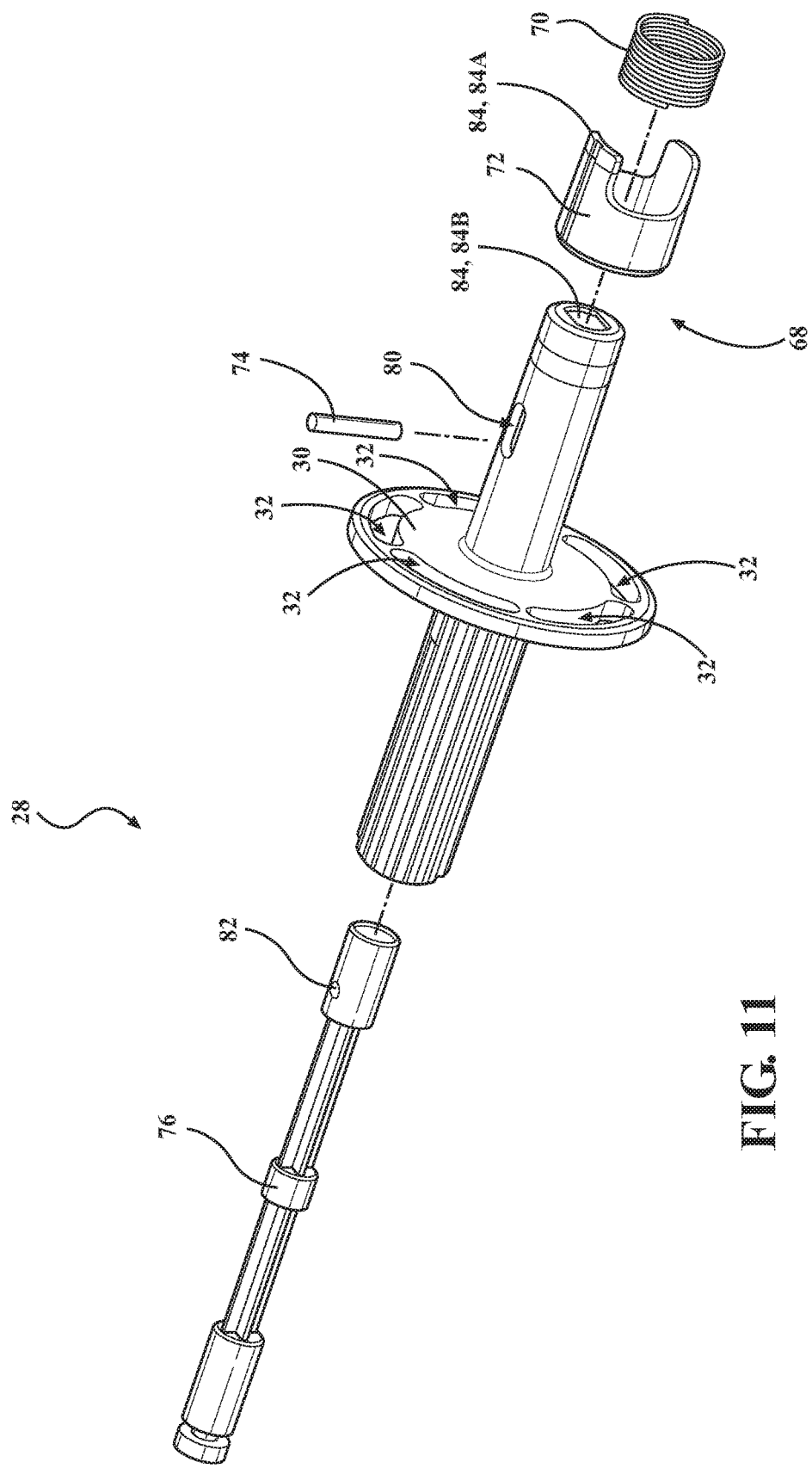
FIG. 11 is a partially exploded perspective view of the shift rod assembly of FIG. 10.
Figure 12:
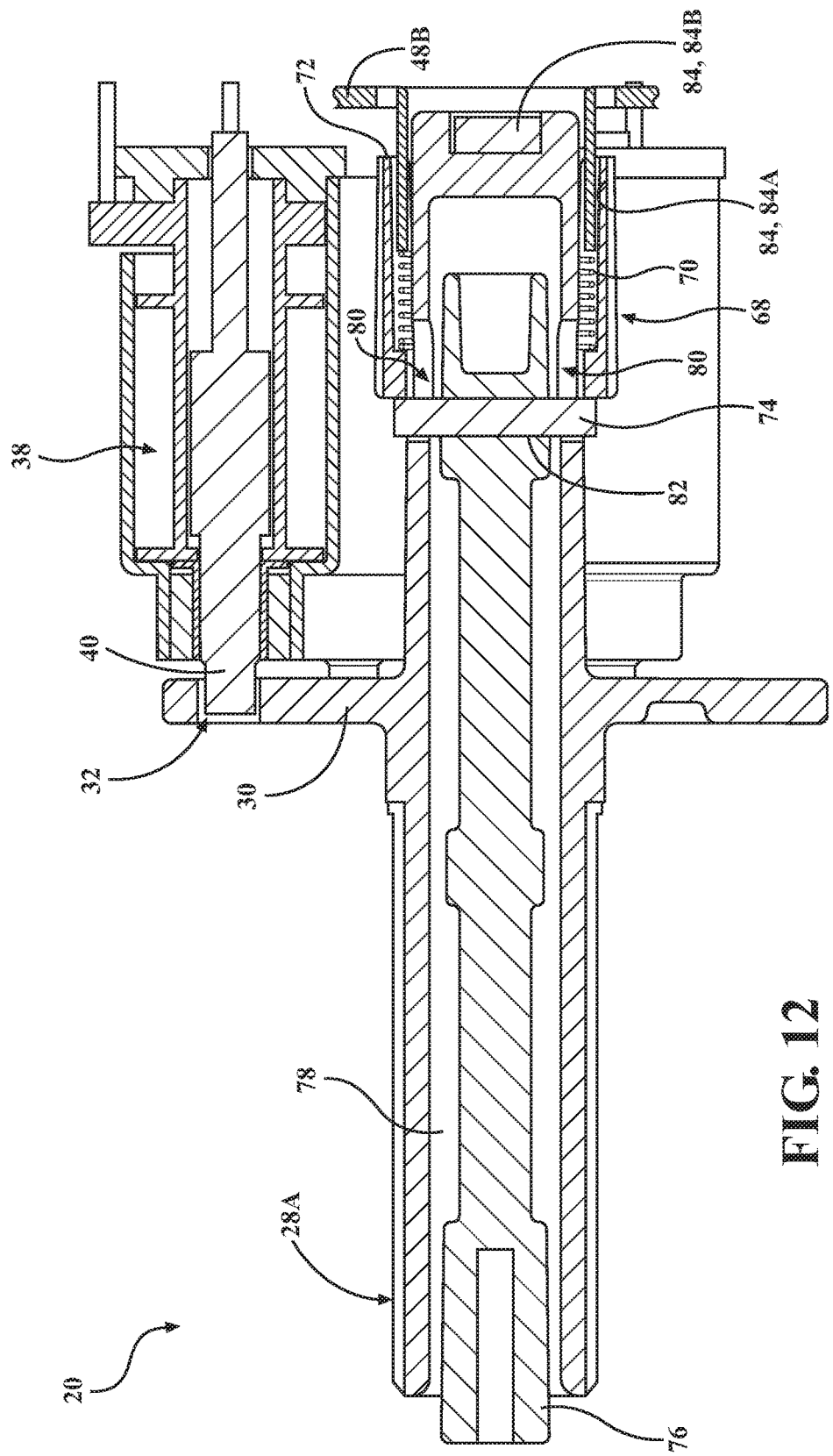
FIG. 12 is a sectional view taken along line 12-12 of FIG. 6A showing the shift rod assembly in a first axial position.
Figure 13:
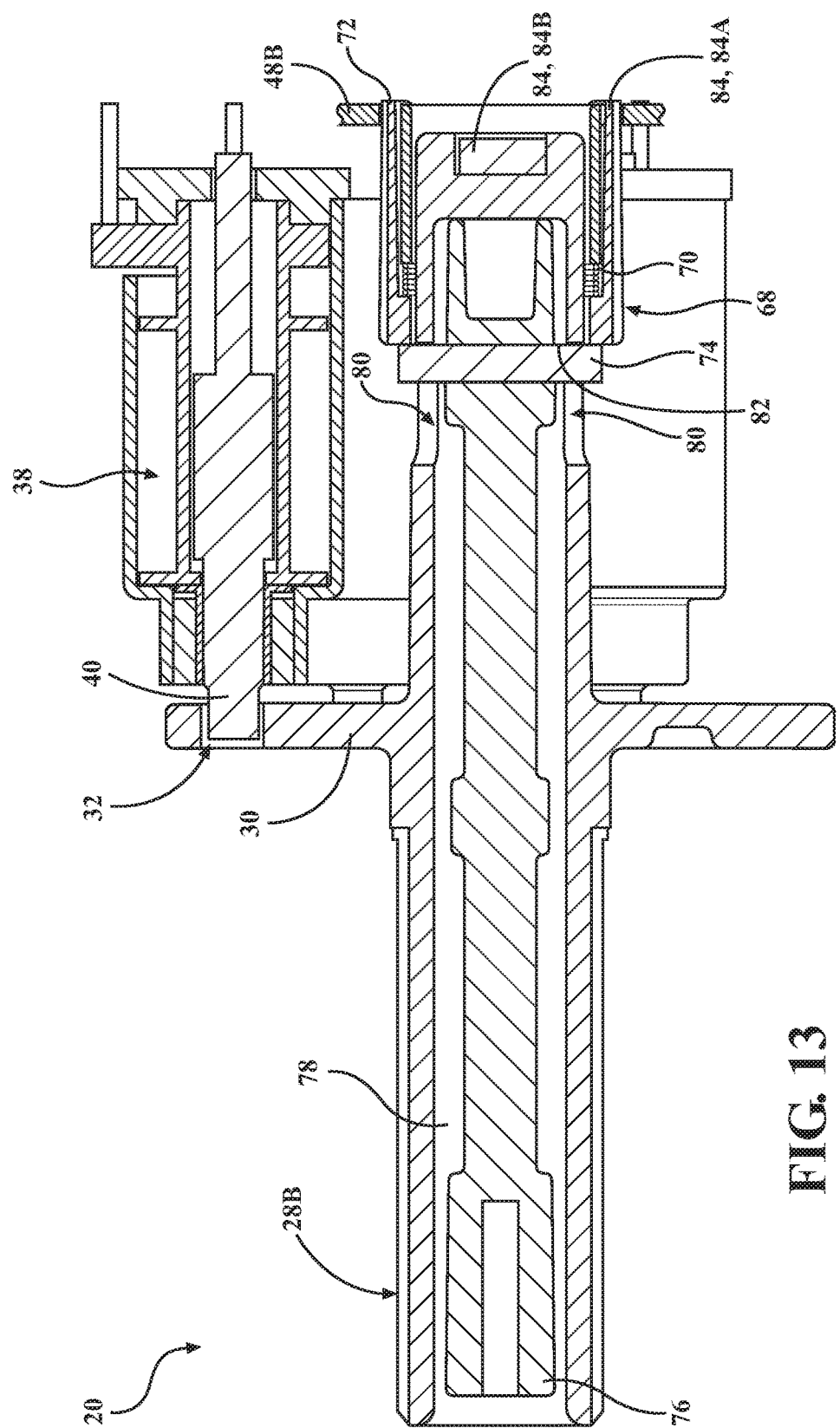
FIG. 13 is an alternate sectional view of FIG. 12 showing the shift rod assembly in a second axial position.

It will be appreciated that the biasing mechanism 68 affords enhanced functionality of the shifter assembly 20 in that the knob 62 also effectively becomes a momentary "button" that can be adapted to communicate with the electronic control unit 24. To that end, the shifter assembly 20 may further include at least one emitter 84 coupled to the shift rod 28 and at least one detector 86 attached to the housing 26. The detector 86 is responsive to predetermined positional changes of the emitter 84 so as to determine the radial and/or axial position of the shift rod, and may be in electrical communication with the electronic control unit 24 (not shown, but generally known in the art). In the representative embodiment illustrated herein, the emitter 84 is further defined as a pair of emitters 84A, 84B representing the axial and rotational positions of the shift rod 28, respectively. Similarly, the detector 86 may be further defined as a pair of detectors 86A, 86B for cooperating with respective emitters 84A, 84B. The axial emitter 84A, shown best in FIG. 10, is coupled to the lever 72 of the biasing mechanism. The rotational emitter 84B, shown best in FIG. 12, is coupled to the shift rod 28. However, those having ordinary skill in the art will appreciate that the emitters 84A, 84B could be coupled to any part of the shifter assembly 20 in any suitable way without departing from the scope of the present invention.

Figure 9:
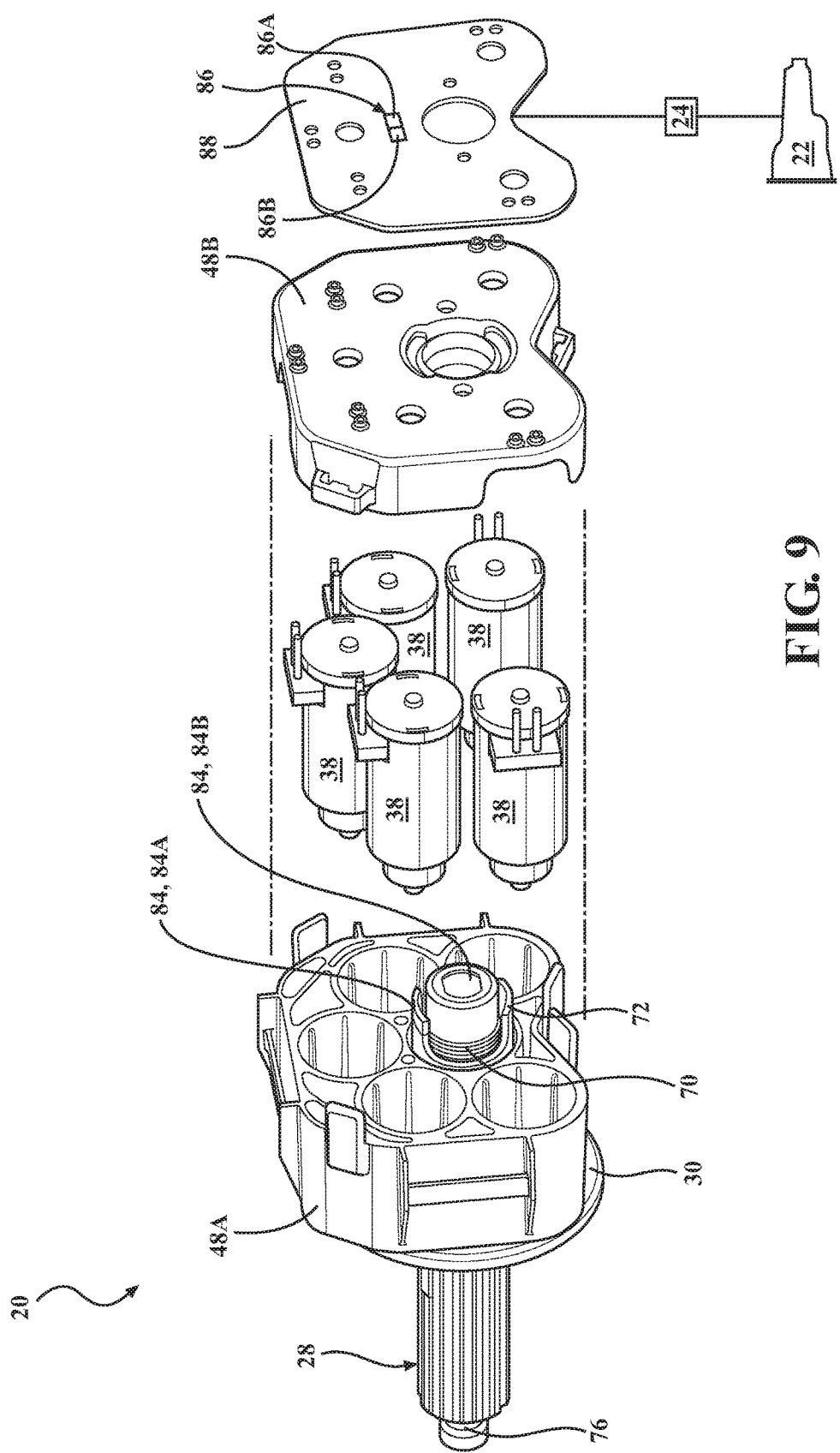
FIG. 9 is an alternate rotated partially exploded view of the shifter subassembly of FIG. 8.

As shown best in FIG. 9, in one embodiment, the detector 86 is attached to a printed circuit board 88 disposed adjacent to the cartridge element 48B, to which the solenoids 38 may also be operatively attached, such as by solder (not shown in detail, but generally known in the art). In one embodiment, the emitters 84A, 84B are further defined as magnets and the detector 86 is responsive to predetermined changes in magnetic fields generated by the magnets to determine the relative axial and/or rotational positions of the shift rod 28. To that end, the detector 86 may be of any suitable type sufficient to sense and respond to changes in magnetic fields. Moreover, it is conceivable that the emitters 84A, 84B could be manufactured from an iron-based material and the detector 86 could be a hall-effect sensor that generates a magnetic field and is capable of responding to changes in the field due to interaction of the iron-based material of the emitters 84A, 84B. To that end, the emitter 84A may be realized as a ferrous enamel, coating, paint, or the like that is applied to the lever 72.

As noted above, rotation of the shift rod 28 is selectively limited by at least one of the plungers 40 in the second position 40B engaging at least one of the ends 34, 36 of the gates 32. As shown in FIGS. 6A-7, when all of the plungers 40 of the solenoids 38 are in the second position 40B, rotation of the shift rod 28 is prevented in either direction in that there is always one plunger 40 engaging the first end 34 of one of the gates 32, and there is always one plunger 40 engaging the second end 36 of one of the gates 32. As shown in FIGS. 6B-6E, both ends 34, 36 of the same gate 32 could engage plungers 40 so as to prevent rotation of the shift rod 28 in both directions. However, as shown in FIG. 6A, rotation of the shift rod 28 could also be prevented in both directions by plungers 40 engaging against ends 34, 36 of different gates 32.

It will be appreciated that the gates 32 move with the shift rod 28 as the driver rotates the knob 62 to select between operating modes of the transmission 22, as discussed above. Thus, depending on which of the N radial positions the shift rod 28 is in, and because of how the gates 32 and solenoids 38 are arranged, the plungers 40 are always able to engage in respectively different "gate positions" 90 within one of the gates 32. The number of gate positions 90 in each of the gates 32 corresponds to the number of solenoids 38 used in the shifter assembly 20. As noted above, a total of five solenoids 38A, 38B, 38C, 38D, 38E are included in the embodiment of the shifter assembly 20 illustrated throughout the Figures. Thus, in this example, each gate 32 includes five respective gate positions 90A, 90B, 90C, 90D, and 90E, wherein gate position 90A refers to the position where one of the plungers 40 in the second position 40B abuts the first end 34 of one of the gates 32, gate position 90E refers to the position where one of the plungers 40 in the second position 40B abuts the second end 36 of one of the gates 32, and gate positions 90B, 90C, and 90D refer to the gate positions between the first and second ends 34, 36 of the gate 32.

As shown in FIGS. 6A-6E, each plunger 40 is always aligned with a different gate position 90A, 90B, 90C, 90D, 90E of one of the gates 32, and no two gates 32 ever have plungers 40 aligned with the same respective gate position 90A, 90B, 90C, 90D, 90E. Thus, it is possible to limit rotation of the shift rod 28 to a specific and predetermined number of radial positions N in either or both rotational directions by selectively moving specific solenoids' plungers 40 between the positions 40A, 40B, as discussed in greater detail below.

It will be appreciated that the configuration of the shifter assembly 20 discussed above enables so-called "infinite turn" functionality, whereby the shift rod 28 can rotate 360-degrees in either direction when all of the plungers 40 of the solenoids 38 are in the first position 40A spaced from the disc 30. Moreover, because the rotational position of the shift rod 28 is known via the emitter 84B, the electronic control unit 24 can be used to actuate specific solenoids 38 to block or otherwise limit rotation of the shift rod 28, as noted above. By selectively blocking rotation of the shift rod 28 between specific predetermined rotational positions N, the shifter assembly 20 can also be configured so as to prevent the driver from selecting inappropriate operating modes of the transmission 22 during vehicle operation. By way of non-limiting example, the electronic control unit 24 could be configured to control the solenoids 38 of the shifter assembly 20 so as to prevent the driver from selecting "reverse" when the vehicle is moving in a forward direction with the transmission 22 operating in "drive" mode.

Taken together, the infinite turn functionality of the shift rod 28 and selective rotation blocking via the solenoids 38 provide additional opportunities for enhanced functionality of the shifter assembly 20 in operation. To that end, each of the solenoids 38 may be assigned to a particular driving mode of operating the transmission 22. In the representative embodiment illustrated herein, five different operating modes are provided for: "park," "reverse," "neutral," "drive," and "sport," each of which can be selectively assigned to a different one of the five solenoids 38A, 38B, 38C, 38D, 38E when the vehicle is first started, irrespective of the physical rotational position of the shift rod 28. Similarly, each of the solenoids 38A, 38B, 38C, 38D, 38E can be subsequently re-assigned to a different operating mode when the vehicle is shut off or re-started, irrespective of the physical rotational position of the shift rod 28 irrespective of the operating mode the transmission 22 was left in. By way of illustration, it is conceivable that the driver could exit the vehicle without switching the shifter assembly 20 from "drive" into "park". In such a situation, the electronic control unit 24 could be configured to determine that the vehicle -should- be parked (such as via signals from an ignition key removal sensor or a driver proximity sensor; not shown, but known in the art) and could subsequently move the transmission 22 from drive into park. Thus, the solenoids 38A, 38B, 38C, 38D, 38E could then be re-assigned such that the solenoid 38A originally assigned to "drive" would be subsequently re-assigned to "park," and the physical orientation of the shift rod 28 need not change.

Determination of how to re-assign the solenoids 38A, 38B, 38C, 38D, 38E could be made based on the relative gate positions 90A, 90B, 90C, 90D, 90E of each plunger 40 when the vehicle is first started. By way of non-limiting example, whichever plunger 40 is in gate position 90A at vehicle startup could be assigned to "park". Thus, in this example, if the shift rod 28 were positioned as shown in FIG. 6A at vehicle startup, solenoid 38A would be assigned to "park" because it is in gate position 90A. Similarly, if the shift rod 28 were position as shown in FIG. 6B at vehicle startup, solenoid 38E would be assigned to "park" because it is in gate position 90A. However, those having ordinary skill in the art will appreciate that solenoid 38 assignment and/or re-assignment could be effected in any suitable way without departing from the scope of the present invention.

In this way, the shifter assembly 20 of the present invention provides improved functionality and usability in connection with conventional automatic transmission systems and, at the same time, reduces the cost and complexity of manufacturing and assembling shifter assemblies 20.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A shifter assembly for changing gears in a vehicle transmission, said shifter assembly comprising:
   a housing;
   a shift rod rotatably supported in said housing and selectively movable between a plurality of radial positions;
   a disc in rotational communication with said shift rod for concurrent movement with said shift rod between said radial positions with said disc defining a plurality of elongated gates each defining respective spaced first and second ends; and
   a plurality of solenoids disposed in said housing adjacent said disc with each of said solenoids having a plunger selectively movable between a first position spaced from said disc and a second position disposed within one of said gates;
   said gates being spaced equally from each other and all of said gates of said shifter assembly being radially aligned about a common reference circle such that said plungers are located about said common reference circle, with rotation of said shift rod being selectively limited by at least one of said plungers in said second position engaging one of said ends of one of said gates; and
   including G gates and S solenoids wherein G refers to the quantity of said plurality of gates and S refers to the quantity of said plurality of solenoids, wherein said shift rod is selectively movable between N discrete radial positions, wherein $N=[(G)*(S)]$, and wherein $N<30$ discrete radial positions.

2. The shifter assembly as set forth in claim 1, wherein said solenoids are equally spaced along an arc, and wherein said arc is concentrically aligned with said common reference circle.

3. The shifter assembly as set forth in claim 1, wherein G is equal to S.

4. The shifter assembly as set forth in claim 1, wherein rotation of said shift rod is prevented when all of said plungers of said solenoids are in said second position.

5. The shifter assembly as set forth in claim 1, wherein said disc is directly fixed to and concentrically aligned with said shift rod for direct movement with movement of said shift rod.

6. The shifter assembly as set forth in claim 1, wherein said common reference circle is defined concentrically with at least one of said shift rod and said disc.

7. The shifter assembly as set forth in claim 1, further including a detent wheel in rotational communication with said disc and having a plurality of radially spaced detents each representing respective radial positions of said shift rod, and further including a spring-loaded detent plunger selectively engaging one of said detents so as to at least partially resist rotation of said shift rod.

8. The shifter assembly as set forth in claim 7, wherein said detent wheel is mounted to said shift rod.

9. The shifter assembly as set forth in claim 7, wherein said spring-loaded detent plunger is operatively attached to said housing.

10. The shifter assembly as set forth in claim 1, wherein said gates are further defined as arcuate slots formed in said disc.

11. The shifter assembly as set forth in claim 10, wherein said arcuate slots are equidistantly spaced about said common reference circle.

12. The shifter assembly as set forth in claim 1, wherein said solenoids are radially spaced about said common reference circle.

13. The shifter assembly as set forth in claim 1, wherein said solenoids are unequally spaced about said common reference circle.

14. The shifter assembly as set forth in claim 1, wherein all of said solenoids are spaced radially from said shift rod at an equal distance.

15. The shifter assembly as set forth in claim 1, wherein said plungers of said solenoids are substantially parallel to said shift rod.

16. The shifter assembly as set forth in claim 1, further including a biasing mechanism interposed between said shift rod and said housing for urging said shift rod axially away from said housing toward a first axial position.

17. The shifter assembly as set forth in claim 16, wherein said shift rod is movable from said first axial position to a second axial position in response to and in the direction of axial force selectively applied to said shift rod.

18. The shifter assembly as set forth in claim 17, wherein said shift rod is movable between said plurality of radial positions in either of said axial positions.

19. The shifter assembly as set forth in claim 17, further including at least one emitter coupled to said shift rod and further including at least one detector operatively attached to said housing with said detector being responsive to predetermined positional changes of said emitter so as to determine at least one of said axial position of said shift rod and a radial position of said shift rod between said radial positions.

20. The shifter assembly as set forth in claim 1, wherein said solenoids are each selectively assigned a different operating mode.

21. A shifter assembly for changing gears in a vehicle transmission, said shifter assembly comprising:
   a housing;
   a shift rod rotatably supported in said housing and selectively movable between a plurality of radial positions;
   a disc in rotational communication with said shift rod for concurrent movement with said shift rod between said radial positions, with a plurality of elongated arcuate slots formed in said disc, each of said arcuate slots having a closed periphery, and each of said arcuate slots defining respective spaced first and second ends;
   a plurality of solenoids disposed in said housing adjacent said disc with each of said solenoids having a plunger selectively movable between a first position spaced from said disc and a second position disposed within said closed periphery of one of said arcuate slots;
   said arcuate slots being spaced equally from each other and all of said arcuate slots of said shifter assembly being radially aligned about a common reference circle such that said plungers are located about said common reference circle, with rotation of said shift rod being selectively limited by at least one of said plungers in said second position engaging one of said ends of one of said arcuate slots.

22. A shifter assembly for changing gears in a vehicle transmission, said shifter assembly comprising:
   a housing;
   a shift rod rotatably supported in said housing and selectively movable between a plurality of radial positions;
   a disc supported for rotation about an axis, said disc disposed in rotational communication with said shift rod for concurrent movement with said shift rod between said radial positions with said disc defining a plurality of elongated gates each having a closed periphery and defining respective spaced first and second ends; and
   a plurality of solenoids disposed in said housing adjacent said disc with each of said solenoids having a plunger selectively movable, in a direction parallel to said axis, between a first position spaced from said disc and a second position disposed within said closed periphery of one of said gates;
   said gates being spaced equally from each other and all of said gates of said shifter assembly being radially aligned about a common reference circle such that said plungers are located about said common reference circle, with rotation of said shift rod being selectively limited by at least one of said plungers in said second position engaging one of said ends of one of said gates.

* * * * *

UNITED STATES PATENT AND TRADEMARK OFFICE
CERTIFICATE OF CORRECTION

PATENT NO. : 9,810,314 B2
APPLICATION NO. : 14/630971
DATED : November 7, 2017
INVENTOR(S) : Jeffrey Behounek et al.

Page 1 of 1

It is certified that error appears in the above-identified patent and that said Letters Patent is hereby corrected as shown below:

In the Claims

Column 10 Line 61 in Claim 1: Please delete "N<30 discrete radial positions." and insert -- N≤30 discrete radial positions. --.

Signed and Sealed this
Fourteenth Day of August, 2018

Andrei Iancu
*Director of the United States Patent and Trademark Office*